(No Model.) 4 Sheets—Sheet 1.

T. DUNCAN.
METER FOR ALTERNATING, PULSATING, OR INTERMITTENT ELECTRIC CURRENTS.

No. 501,000. Patented July 4, 1893.

WITNESSES:
R. S. Robertson
I. B. White

INVENTOR
Thomas Duncan
BY Chapin & Denny
his ATTORNEYS.

(No Model.) 4 Sheets—Sheet 2.

T. DUNCAN.
METER FOR ALTERNATING, PULSATING, OR INTERMITTENT ELECTRIC CURRENTS.

No. 501,000. Patented July 4, 1893.

WITNESSES:
R. S. Robertson
I. B. White

INVENTOR
Thomas Duncan
BY Chapin & Denny
his ATTORNEYS.

(No Model.) 4 Sheets—Sheet 3.
T. DUNCAN.
METER FOR ALTERNATING, PULSATING, OR INTERMITTENT ELECTRIC CURRENTS.
No. 501,000. Patented July 4, 1893.
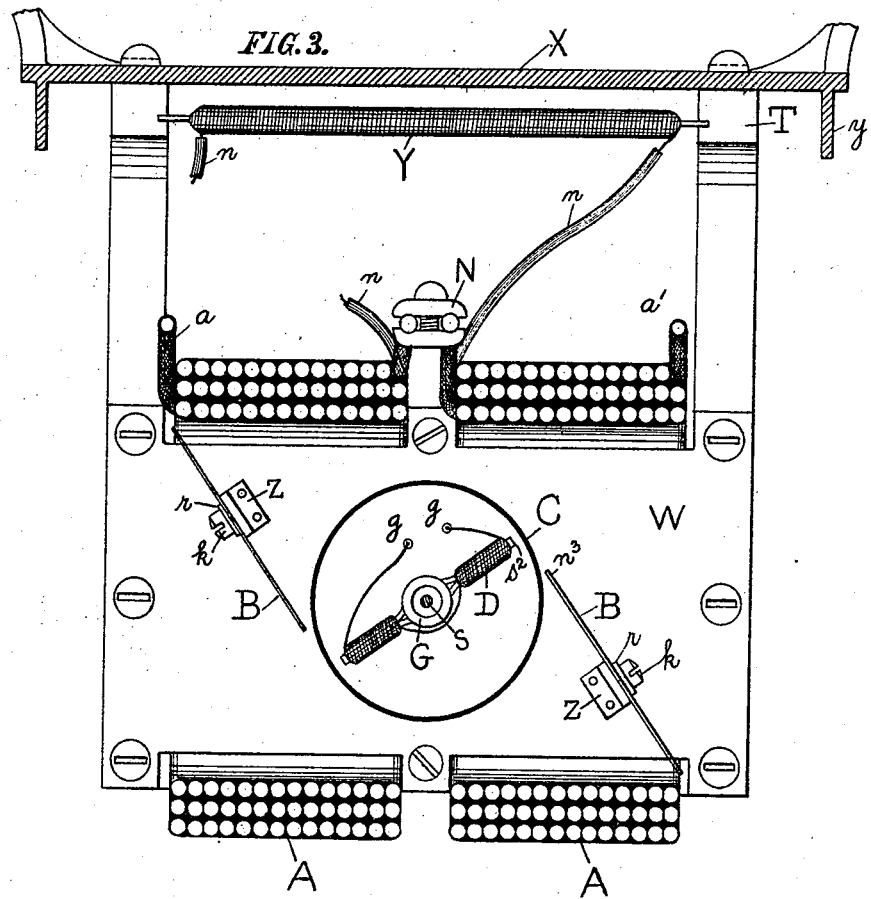
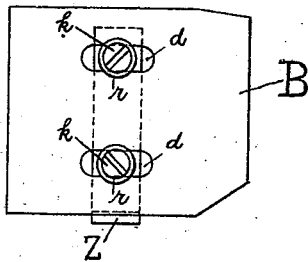
WITNESSES:
R. S. Robertson
T. B. White
INVENTOR
Thomas Duncan
BY Chapin & Denny
his ATTORNEYS.

(No Model.)  4 Sheets—Sheet 4.
T. DUNCAN.
METER FOR ALTERNATING, PULSATING, OR INTERMITTENT ELECTRIC CURRENTS.
No. 501,000. Patented July 4, 1893.
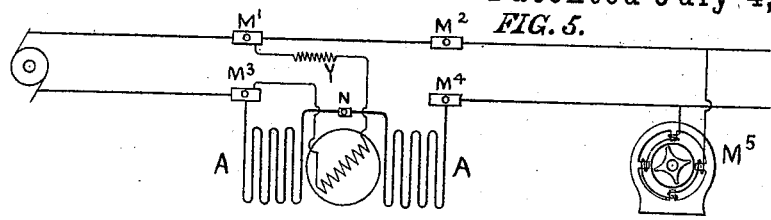
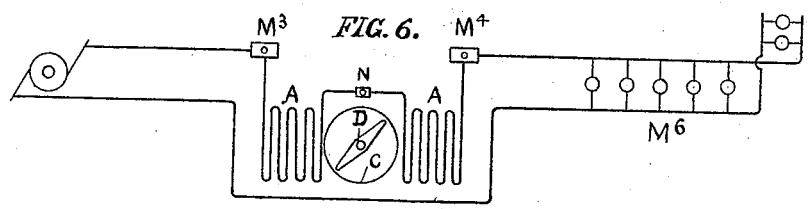
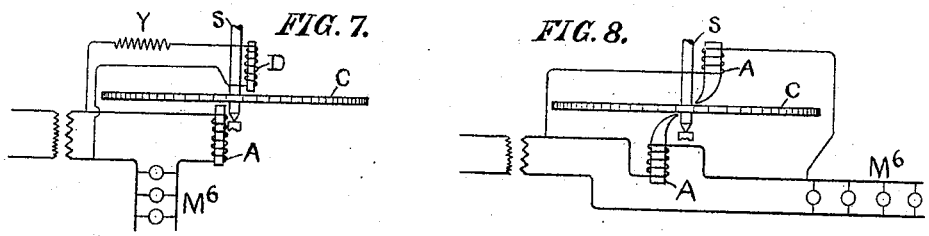
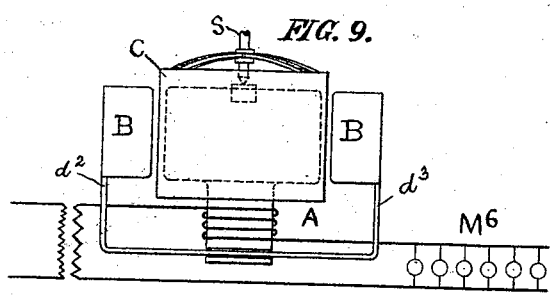 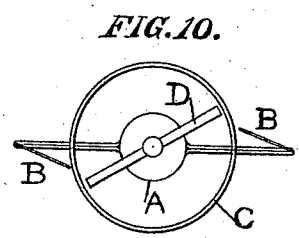
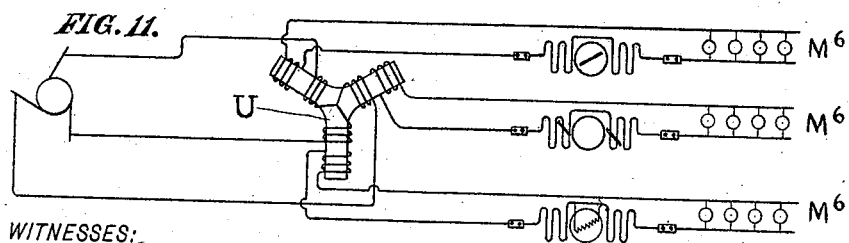
WITNESSES:
R. S. Robertson
T. B. White
INVENTOR
Thomas Duncan
BY Chapin & Denny
his ATTORNEYS

UNITED STATES PATENT OFFICE.

THOMAS DUNCAN, OF FORT WAYNE, INDIANA.

METER FOR ALTERNATING, PULSATING, OR INTERMITTENT ELECTRIC CURRENTS.

SPECIFICATION forming part of Letters Patent No. 501,000, dated July 4, 1893.

Application filed October 10, 1892. Serial No. 448,310. (No model.)

*To all whom it may concern:*

Be it known that I, THOMAS DUNCAN, a citizen of the United States, residing at Fort Wayne, in the county of Allen and State of Indiana, have invented certain new and useful Improvements in Meters for Alternating, Pulsating, or Intermittent Electric Currents; and I do hereby declare that the following is a full, clear, and exact description of the invention, which will enable others skilled in the art to which it appertains to make and use the same, reference being had to the accompanying drawings, which form part of this specification.

In a certain application for improvements in electric meters for alternating currents, filed by me on December 21, 1891, Serial No. 415,825, I have described an apparatus for and a method of measuring alternating, pulsating or intermittent currents.

The present invention relates to certain improvements in the apparatus described in said patent, and it involves various details of constructions, which will be described in connection with the accompanying drawings.

It will not be here necessary to describe particularly the method of operation of the meter, since it has already been fully set forth in the patent mentioned, and reference may be had thereto for such description.

In the accompanying drawings, forming part of the specification, similar letters indicate corresponding parts, in the several views.

Figure 1 is a front elevation of a complete meter, and Fig. 2 is a side elevation of the same. Fig. 3 is a plan, partly in section, of a portion of the motive part of the apparatus. Fig. 4 shows in detail the method of adjusting and securing the iron strips used within the field or energizing coils. Fig. 5 shows the method of connecting the meter in circuit for measuring the total energy or used as a watt-meter. Fig. 6 is a coulomb meter and the connections for same. Figs. 7 and 8 are other methods of construction where the revolving armature assumes the form of a disk. Figs. 9 and 10 are elevation and plan views of another modification in the construction which will be mentioned hereinafter in this specification. Fig. 11 shows three meters connected into, and measuring the energy consumed in the three separate circuits of a triphase transformer.

Referring now to the drawings, Figs. 1, 2, 3 and 4, A and A represent the series energizing field coils, and are connected in the main source of supply feeding the lamps or motors whose consumption of energy it is desired to measure.

The method of connecting the meters in circuit is shown in Figs. 5 and 6, where the former shows a watt-meter for measuring the total energy in any given time, or in other words it integrates and records ampères × volts × time. The latter shows the necessary connections for a coulomb meter where only the current strength and time are considered, or the product of the number of lamps and their time of burning. These coils A and A are virtually one coil, but since it becomes necessary to separate them at their center for the purpose of admitting the shaft or spindle S I will speak of them as two coils. Their inner terminals are connected together by means of the binding clamp marked N. This admits of their being separated, assembled, or taken apart for repairs with facility; as shown, these field coils are connected in series, but other combinations are used, such as in cases of higher types when twice the current density is used, and where it is not desirable to use wire to wind them having twice the circular mileage, they are connected in multiple or parallel arc. These connections and combinations are well understood by those versed in the art. These outer terminals marked $a$ and $a'$ are made secure to the main binding posts or meter terminals $M^3$ and $M^4$. By means of these a contact is obtained from the transformer or other generator of an alternating or pulsatory nature through the leading in holes placed in the back or metal support $x$ of the meter and passing directly through said binding posts as represented by the holes $a^2$ and $a^3$ in same. The other binding posts marked $M'$ and $M^2$ are for the purpose of bringing within the meter the other side of the circuit opposite to that in which the series coils A and A are connected, in order to obtain the full drop of potential existing between the two sides of the circuit to energize the magnetic diverter D placed within the revolving armature or cylinder C. These terminals M' M² M³ M⁴ are thoroughly insulated from the back of the meter or support $x$ by a block L of hard rubber or other good insulating material, such as wood boiled for several hours in paraffine wax; this being more easily worked and cheaper than the hard rubber it becomes preferable.

The aforementioned terminals being screwed to the insulating block L the whole is there fastened to the metal support $x$. This base $x$ is provided with four lugs marked K K K K each having a hole as shown in Fig. 1 for screwing same to a suitable support in practice. In Fig. 2 they are also shown to extend backward from $x$ for the purpose of allowing the leading in wires from the transformer or other source of supply to pass behind $x$ into the holes of the terminals M' M² M³ M⁴.

B and B placed within the energizing coils A and A are strips of sheet iron. These are shown in detail in Fig. 4. Their purpose is to vary the resistance of the magnetic circuit of A and A and for conducting and condensing the lines of magnetic force produced by the current used and passing around the energizing coils A and A to a point at or near the periphery of the revolving armature C which shall be at an angle as related to the plane of said coils A and A and the center or axis of rotation of C as shown in the plan view Fig. 3; thereby producing rotation by repulsion of C. These field strips B and B are constructed so as to be capable of adjustment longitudinally to and from the cylinder thereby determining the torque or speed of the meter when testing or calibrating. The slots $d$ and $d$ are provided for their longitudinal adjustment and when such has been determined they are made secure to the upright support Z by means of the screws $k$ and washers $r$. This upright support Z is fastened to the upper base plate W. These strips B and B may be dispensed with entirely or only one may be used, since there is placed within the armature C a diverter D which accomplishes the same purpose, viz: causing the magnetic flux to cut through the cylinder at any angle determined by the position and angle of said diverter D; but when both are used of course the apparatus is more efficient.

Again the meter is still operative, but as a coulomb meter, if I remove the shunt diverter D from within the armature or secondary coil and use but one or both of the strips B. These strips may be also provided with a shunt winding for the purpose of overcoming the friction and inertia of the moving parts of the meter.

C represents a cylindrical armature or revolving secondary made of silver, copper, or aluminum iron or other electric conducting metal. This armature may also be made and used in the form of a disk as shown in Figs. 7 and 8. It is virtually the secondary of a transformer which is pivotally constructed and capable of rotation, and placed within, or in inductive proximity to a primary or energizing source A and A whereby the secondary currents developed within it produce magnetic poles which have the same polarity as the flux producing them, and being at an angle as determined either by the diverter D or the strips B and B, or both; these induced poles in C are repelled by the poles of A and A which have been condensed at the points of B and B nearest the cylinder.

The armature C is fastened to a shaft or spindle S which also carries at its top a worm $s$ from whence the number of revolutions made by C are communicated or taken up by a worm wheel directly behind $s$ not shown in the drawings and connected to the registering train R. The top of said spindle S is encountered and held by a bearing P adapted for vertical adjustment by means of a thread on the same and fitted into the supporting arm $t$, and a check nut $p$ for fastening said bearing when the requisite adjustment is obtained. S passes down through a tube G and rests in a jeweled bearing H. The retarding fans E E E E are also fastened and revolve with it and the armature C. The action of these fans is such that they determine or produce a resultant speed which represents the amount of energy or current being used or consumed in the following manner: Since the force acting on the armature C is proportional to the square of the current, which is to be measured and flowing through the series or field coils A and A, and in order that the armature C may rotate with twice the velocity when the strength of the current is doubled through said coils A and A, it is necessary that the square of the rotations measure the brake or retarding force against which the motive part of the meter is doing work; then the square of the number of rotations in a given time is a measure of the square of the current flowing through the meter and being consumed; therefore the rate of rotation measures the strength of the current and the number of rotations measures its quantity.

D is a shunt wound magnetic diverter used inside the revolving cylinder and whose magnetism represents the electro-motive force factor in volts.

The flux produced by the coils A and A represents the ampères or other factor necessary for the computation of energy in watts; the polarity of D's poles at any instant will be opposite to the nearest poles of the field coils A and A representing the current in ampères so that the magnetism of each will follow a path common to both in the following manner: Assuming that an impulse of current enters the right hand terminal $a'$ of the series coil in Fig. 3 and passing out at $a$ the direction of the magnetic flux will be from right to left through said coils; in other words it will establish a south pole to the left of said coils, but following the flux from right to left and defining the intermediate poles we trace the cause of rotation and common magnetic pathway of both fields and diverter. The magnetism entering and passing along the iron strip B at the right hand side will produce a north pole at its point or end $n^3$ nearest the cylinder C, and a south pole at its other end nearest the convolutions of the coil A, and passing to the nearest end $s^2$ of the diverter would by induction tend to produce an opposite or south pole, but since said diverter as used in a watt-meter contains no iron but a non-metallic core upon which is wound a fine wire shunt, representing the electro motive force as before mentioned; the necessary poles are therefore produced by said shunt winding so that the flux passes from the point $n^3$ through the cylinder C to the opposite south pole $s^2$ of the diverter D, thence to the other end of the diverter through the cylinder again at a point diametrically opposite to the second iron strip B on the left hand side. From this it will be easily understood that any change in the current through the series coil A and A and an increase or decrease in the electro motive force will produce a correspondent change in the amount of magnetic flux representing either factor, in the series field, and shunt field or diverter respectively.

The coils of the diverter as shown in Fig. 3 are wound upon and fastened to two strips of insulating material which fit into two grooves or recesses provided in each side of the supporting and adjusting tube G. Their terminals are carried through two small holes $g$ $g$ punched in the upper base plate W and passing underneath are brought out between the series coils A and A, one terminal connecting in series with the non-inductively wound German silver resistance Y and passing through said resistance is connected to the binding post M' while the other terminal is connected to the other side of the circuit at the binding post $M^3$ these connections being made by two small screws and washers provided for the purpose and shown at $m$ and $m$.

The tube G upon which the diverter D is fastened fits through a hole also punched out in the upper base plate W. The lower end of this tube being threaded, it screws into the lower base plate V, the plate W being used for keeping it in a vertical position. G is also used for adjusting the diverter vertically, and determining the angle at which it is to be placed when used for altering the speed. When the requisite speed and angle have been obtained, the check nut F is screwed up tight against the lower base plate V which keeps the diverter D and the diverter tube G in position. At the bottom of G and around the periphery of the check nut F are shown small holes drilled to admit a pin for turning and adjusting same.

In place of the German silver resistance Y which is wound upon a mica card and slipped into grooves provided in the supporting arms T T any other resistance of a non-inductive character may be used, such as an incandescent lamp.

J is a support for the spindle, the armature and fans revolving therewith and the lower jewel bearing H which is screwed into and supported by it is held in place with the two check nuts I I.

The field coils A and A are clamped and held in position between and by the plates V and W which are themselves screwed to the supporting arms T T. W is provided with two recesses on either side into which the field coils A and A fit and which prevent their injurious displacement during rough handling and transportation, an important factor in the experience of manufacturers of electric meters.

The registering train R is made to read direct in horse power hours, as well as in watt hours, ampère hours or lamp hours.

A flange $y$ on the base X over which the cover of the meter fits closely prevents the entrance of dust or insects.

When constructing the meter for measuring as a coulomb meter the shunt wound diverter D may be dispensed with and an iron one made to take its place, since it is not necessary to take into consideration the electro motive force of the circuit, as the only factors needed are the current strength in ampères and the time. This iron magnetic path diverter may be made in various forms, such as a straight bar, or may have its ends turned a little and approaching the shape of the letter S, or it may be made to fill the entire space within the armature and revolve therewith or in a stationary or fixed position as a core, but if the two latter are used, the iron strips must be used to produce the diverting angle, or otherwise the field coils themselves will have to be placed at an angle approaching a tangent to the periphery of the armature.

Fig. 5 shows the connection of a watt meter measuring the energy supplied to an alternating current motor operating upon the same principle as the meter itself. In lieu of this may be employed any other power absorbing apparatus such as incandescent lamps.

Fig. 6 shows a coulomb meter and connections, measuring the product of the ampères or lamps in use and their time in hours of burning or any fraction thereof.

Figure 1:
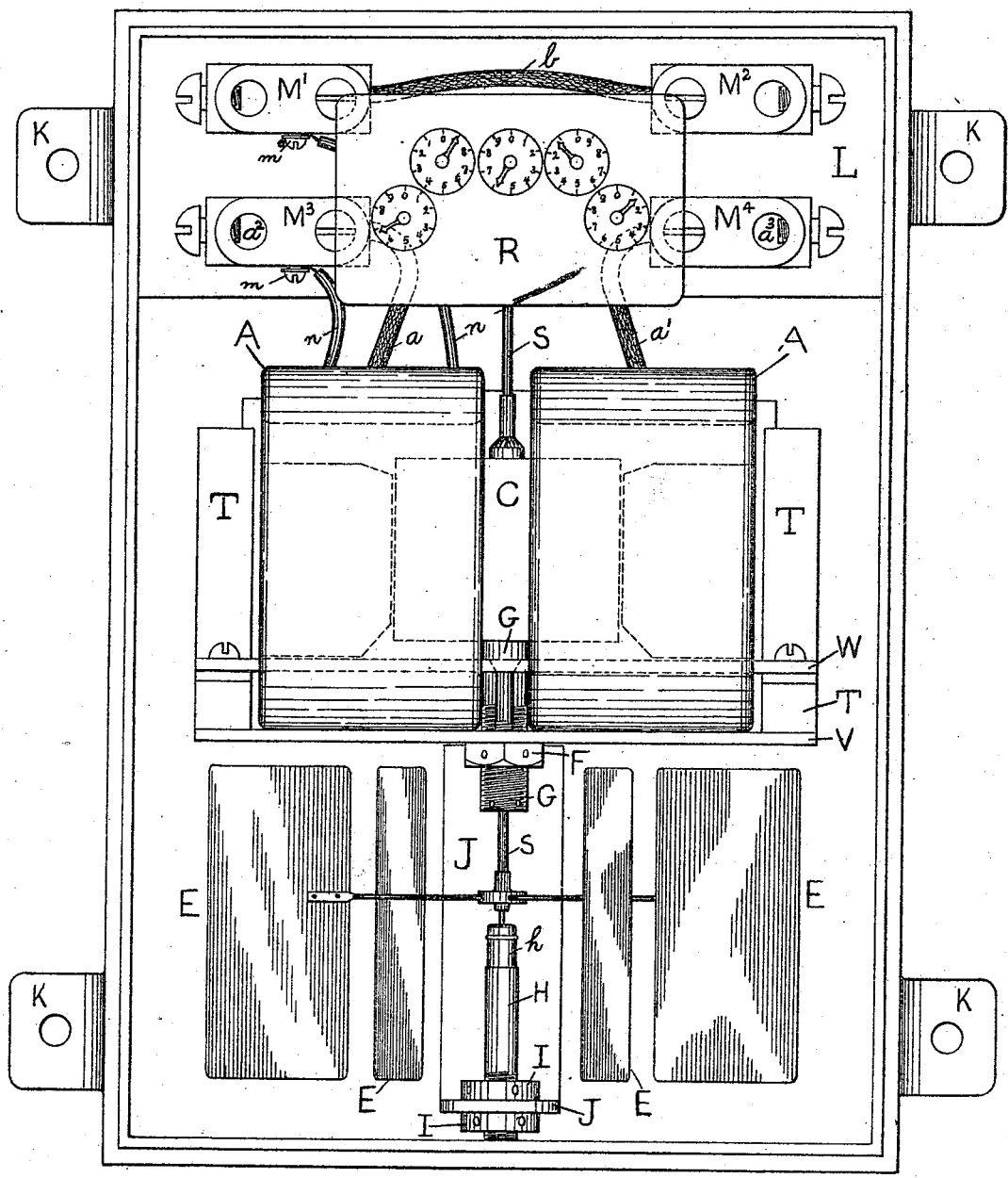
Figure 2:
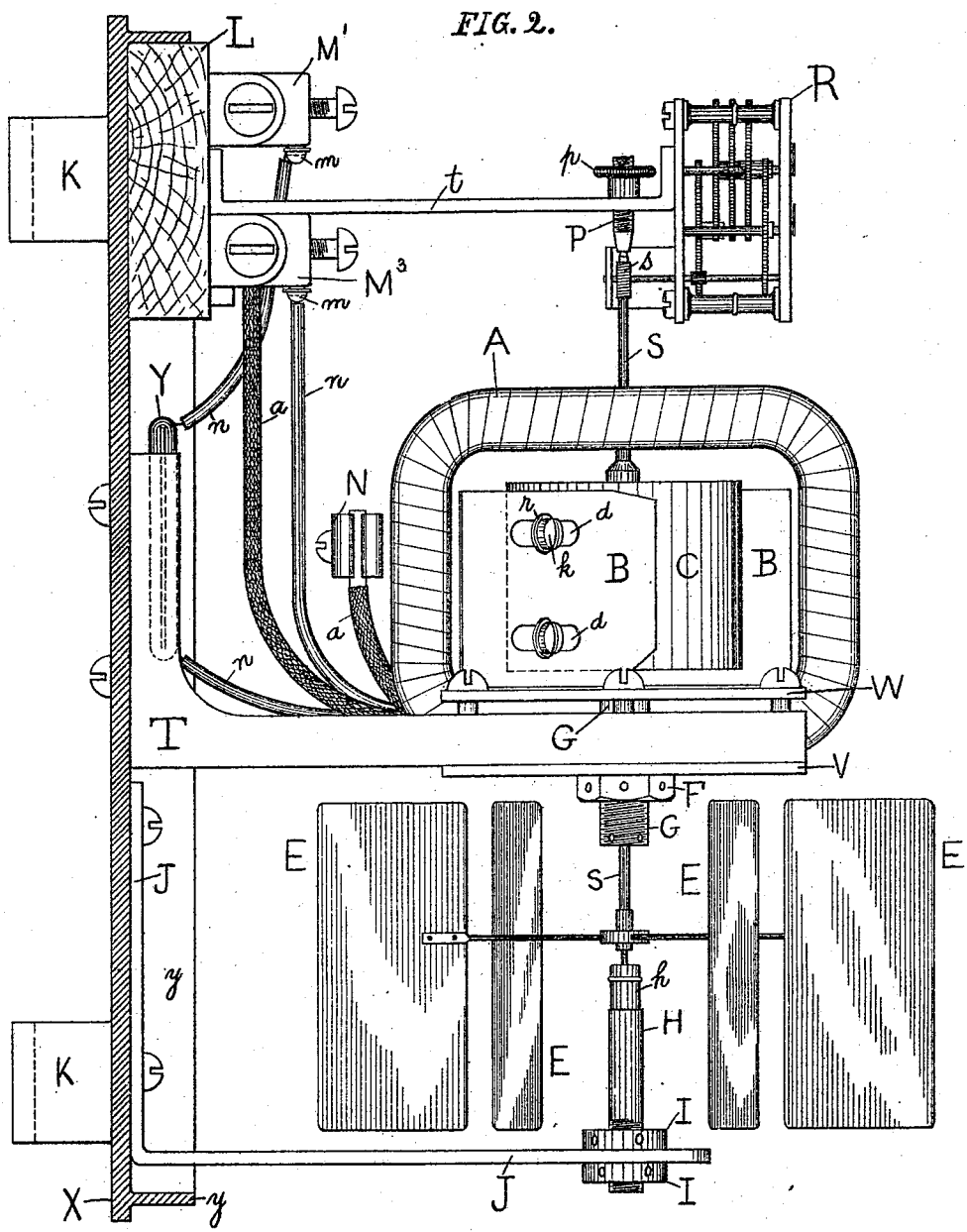

Figs. 7 and 8 represent a disk armature or secondary used instead of a cylinder. Underneath said disk in Fig. 7 is shown the series or energizing coil A in series with the lamps $M^6$, and placed a little to one side over the disk is shown another magnet which is wound with fine wire in shunt or multiple arc from the two terminals or sides of the circuit, and acting as a diverter for the purpose of diverting or drawing the flux through said disk at an angle in order to develop the secondary currents with their poles to one side of the vertical plane of the energizing coil A in order to produce rotation by repulsion of the disk C.

Fig. 8 has two series coils, one above and the other below the disk. These are shown to be in multiple arc but may be connected in series as necessity requires. A multiplicity of coils may be also used, and each of these coils placed in the several circuits of a polyphase system of distribution.

Fig. 9 is an elevation showing another modification in the construction of my meter, Fig. 10 being a plan view of the same. In these the flux produced by the current to be measured is caused to enter and pass into the cylinder in a line coincident with the axis of rotation and by means of the diverting strips D D the necessary rotation of the cylinder is obtained. By means of the arms $d^2$, $d^3$ the diverting strips D and D are adjustable on a common center with C; hence they can be moved around the cylinder for the purpose of obtaining any speed and in either direction. This construction has the advantage of tending to eliminate the solid friction which is present at the point of bearing contact, in all moving bodies, by the repulsive effect produced by the magnetic flux of the energizing field or coil A upon the revolving cylinder C which tends to lift or repel it upward in a vertical line coincident with its center or axis of rotation. The resisting or work absorbing part of the apparatus or fans, can in this case be secured directly to the cylinder and revolve therewith, thus reducing the size and general appearance of the meter perceptibly. The supporting arms $d^2$ and $d^3$ may be made of iron and wound with a shunt coil and connected either in series or parallel arc with each other for the purpose of producing an auxiliary field to overcome the friction and inertia of the moving or rotative parts of the meter.

Fig. 11 shows the manner in which three of the meters described in this specification may be connected into the three circuits of a triphase system of distribution. The two upper ones as shown are coulomb meters and the lower one is a watt or energy meter. U represents a triphase transformer, whose three secondary circuits are supplying current through the meters to the lamp groups $M^6$, $M^6$, $M^6$.

In Figs. 7 and 8 when the series coils are connected in the several circuits of a polyphase system of distribution, no diverters may be used since rotation of the disk will take place due to the revolving magnetic fields. When diverters are used they may be placed directly over, and when moved to one side from the vertical line of the series coils the rotation is due to both the rotary fields and repulsive effect.

What I claim as new and useful, and desire to secure by Letters Patent, is—

1. In an electric meter the combination of a revolving secondary, a primary coil or coils traversed by the current to be measured, a magnetic path diverter, and the base pole W for securing and holding said primary in position during usage and transportation, all substantially as herein before described.

2. In an electric meter the combination of a revolving secondary or armature, a primary coil or electro magnet traversed by the current to be measured, and a diverter whose magnetic and diverting properties are imparted or communicated thereto by means of a shunt or multiple arc fine wire winding, wound upon a non metallic core and representing the fall of potential in volts of the generator or source of supply, all substantially as set forth and described.

3. In an electric meter for alternating currents the combination of a revolving secondary, a primary coil or electro magnet traversed by and representing the ampères or current strength to be measured, a diverter whose magnetic and diverting properties are imparted or communicated thereto by means of a shunt or multiple arc fine wire winding of high resistance wound upon a non metallic core and representing the electro motive force in volts of the generator or source of supply, and a non inductive resistance in series therewith and fitted into slots in T and T, all substantially as described.

4. In an alternate electric current meter the combination of a rotative secondary, a primary coil or electro magnet traversed by and representing the ampères or current strength to be measured, an adjustable magnetic diverter for determining the angle at which the magnetic flux emanating from or produced by said primary coil, shall encounter, cut through or thread the plane of said secondary and a diverter tube G on which said diverter is attached and capable of adjusting same vertically, and to any horizontal angle for varying the initial speed, direction of rotation or both, all substantially as described.

5. In an alternate current electric meter the combination of a rotative secondary, a primary coil or electro magnet traversed by the current to be measured, and the field or primary coil strips B and B slotted and made adjustable laterally for increasing or decreasing the distance or air gap intervening between their points at which the magnetic flux is condensed, thereby varying the magnetic resistance of the primary coil or coils within which they are located and used as a means for varying the speed and producing rotation of the armature or secondary, all substantially as set forth and described.

6. In an electric meter for alternate currents, the combination of a rotative secondary, a primary coil or electro magnet traversed by the current to be measured, the primary coil or field strips B and B and the vertical supports Z and Z to which said field strips are attached and secured, when the requisite adjustment to or from the armature is obtained, by means of the set screws and washers provided for said purpose, substantially as described.

7. In an electric meter for measuring alternating currents the combination of a pivoted revolving secondary, a primary coil or coils carrying the currents to be measured and whose magnetic impulses repel said closed secondary, a magnetic diverter suitably arranged for the purpose set forth and the adjustable magnetic field strips B and B for varying the density of the magnetic flux emanating from and produced by the current to be measured in said primary coil or coils all substantially as herein set forth and described.

8. In a transformer motor meter for measuring alternating, pulsating or intermittent current of electricity, the combination of a closed metallic secondary in the form of a cylinder, a primary coil or coils carrying the current to be measured and repelling said secondary, a diverter for altering the angle of flow of the magnetic impulses through said revolving secondary for the purpose set forth, and a steel spindle S to which said revolving secondary is attached, all substantially as described.

9. In an electric transformer motor meter for measuring alternating, pulsating or intermittent currents of electricity, the combination of a closed metallic armature, a primary coil, coils, or electro magnets traversed by or representing the current to be measured, a shunt wound, paramagnetic metal diverter, a spindle carrying said closed metallic armature and revolving between jeweled bearings, and a counting, registering or indicating mechanism actuated by the revolutions of said spindle all substantially as set forth and described.

10. In combination with the revolving armature of a transformer motor meter suitable for measuring alternating pulsating or intermittent currents of electricity, a primary field or field traversed by or representing the current strength to be recorded and repelling said revolving armature, an adjustable diverter, the paramagnetic field strips B and B a steel spindle revolved by said armature and secured thereto, a registering device actuated by the revolutions of said armature, a retarding device for governing the rotative force and speed of said armature and the upper base plate W for securing said primary field or coils, all substantially as described.

Signed by me this 6th day of October, 1892.

THOMAS DUNCAN.

Witnesses:
JOHN E. DALTON,
HENRY R. WOLFE.